ated July 21, 1970

United States Patent Office
3,520,849
Patented July 21, 1970

3,520,849
NORMALLY SOLID ORGANIC PHOSPHORUS POLYMER
Edwin J. Vandenberg, Foulk Woods, Wilmington, Del., assignor to Hercules Incorporated, Wilmington, Del., a corporation of Delaware
No Drawing. Filed Dec. 14, 1967, Ser. No. 690,433
Int. Cl. C08g 33/16
U.S. Cl. 260—47    13 Claims

ABSTRACT OF THE DISCLOSURE

Normally solid phosphorus polymers are obtained by the polymerization of cyclic phosphates or phosphorothionates or the copolymerization of these cyclic phosphorus compounds with an epoxide, aldehyde or cyclized aldehyde, or oxetane. These polymers have high molecular weights, having RSV's of at least 0.09 as measured in dimethylformamide, and many are crystalline. Catalysts for the polymerization are alkylmagnesium compounds or reaction products thereof with a polyreactive compound such as ammonia. These phosphorus compounds are useful as additives for thermoplastic resins as stabilizers, to increase flame resistance, and to improve low temperature properties. They can be hydrolyzed or saponified to yield water-soluble phosphorus polymers useful as thickeners and as protective colloids.

---

This invention relates to a novel organic polymer containing phosphorus, and to a process for making the polymer.

The phosphorus polymer of this invention is characterized by at least one recurring structural unit having the formula:

(I) 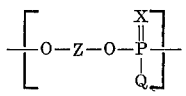

wherein X is selected from the group consisting of the O and S radicals, Q is selected from the group consisting of the OR and $\overline{O}\overset{+}{M}$ radicals, R is selected from the group consisting of alkyl, cycloalkyl and aryl radicals and these radicals containing as substituents in any position alkyl, cycloalkyl, aryl, halo, haloalkyl, cyano, and cyanoalkyl radicals, $\overset{+}{M}$ is selected from the group consisting of the hydrogen and alkali metal cations, and Z is selected from the group consisting of alkylene, cycloalkylene and arylene radicals. Examples of alkyl radicals include the methyl, ethyl, propyl, isopropyl, n-butyl, sec-butyl, tert.-butyl, hexadecyl, octadecyl, and the like radicals. Typical cycloalkyl radicals include the cyclopropyl, cyclobutyl, cyclopentyl, cyclohexyl, cyclooctyl and the like radicals. Examples of aryl radicals comprise phenyl, naphthyl and the like. The halo radicals are the fluoro, chloro, bromo and iodo radicals. Examples of the haloalkyl radicals include the mono, di, tri, etc. (where applicable), fluoro-, chloro-, bromo-, and iodo- substituted methyl, ethyl, tert.-butyl, octadecyl, and the like radicals. The alkylene radicals encompass the methylene, ethylene, n-propylene, isopropylene, and the like radicals. Examples of cycloalkylene radicals include the cyclopropylene, cyclobutylene, cyclopentylene, cyclohexylene, and the like radicals. Representative arylene radicals comprise the phenylene, naphthalene and the like radicals. Typical cyanoalkyl radicals include the cyano substituted methyl, ethyl, tert.-butyl, octadecyl and the like radicals. Examples of an alkali metal ion are the lithium, sodium, potassium, rubidium and cesium ions.

The prior art discloses phosphorus homopolymers having recurring structural units according to the foregoing Formula I when Q is an OR radical. However, in general these homopolymers are normally liquid or, if normally solid, either do not have one or more desirable properties possessed by the polymer of this invention, or are substantially inferior in one or more desirable properties.

The phosphorus polymer of this invention is solid at 20–25° C. Some embodiments thereof at 20–25° C. are waxy, others are rubbery, while others are very hard. In general the polymer of this invention is thermoplastic, that is, it is thermally formable. When Q is the OR radical, the homopolymer embodiments generally are insoluble in water. However, when Q is the $\overline{O}\overset{+}{M}$ radical, the homopolymer embodiments generally are soluble to a substantial extent in water.

A number of embodiments of the polymer of this invention have elastomeric properties. These elastomeric embodiments generally are easily cross-linked with metallic oxides (ZnO, MgO, CaO, and the like). This is especially true in the case of the embodiments comprising chloroethyl groups, which also are cross-linkable by reaction with diamines, 2-mercaptoimidazoline and other curing agents for chlorinated polymers such as neoprene, chlorinated polyethylenes, epichlorohydrin elastomers, and the like. Cross-linked polymer of this invention is advantageously compounded with a filler, particularly reinforcing carbon blacks, silicas, clays, aluminas, and the like. Many of these rubbery, cross-linked embodiments have excellent dynamic properties, good low temperature behavior, excellent resistance to heat and light oxidation and to ozonation and, in a number of instances, good solvent resistance.

Preferred embodiments of the phosphorothionate polymer of this invention, especially when such are made by catalyzing the polymerization of cyclic alkylene phosphorothionate monomer material with dialkylmagnesium catalyst material, are characterized by substantial X-ray crystallinity and, therefore, have utility in fibers, films, sheets, rods and other shaped articles.

Some embodiments of the polymer of this invention have flame resistance, in some instances being substantially self-extinguishing and in other instances being substantially nonburning.

The phosphorus polymer of this invention, particularly when Q in the formula is the OR radical, whether crystalline or amorphous, has utility in general as an additive for lubricating oils and gasoline for stabilization and for improvement of flow and lubricant properties, and to synthetic resins, for example, polypropylene and the like, to increase oxidation and heat stability, and for improvement of impact strength.

The phosphorus-containing polymer of this invention, wherein Q is the OR radical, is made by contacting monomer material consisting essentially of at least one cyclic phosphorus monomer having the general formula:

(II) 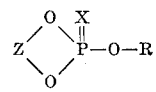

wherein X, R and Z have the same meanings as described above, with a catalytic quantity of polymerization catalyst material therefor.

The phosphorus-containing polymer of this invention, wherein Q is the $\overset{-}{O}\overset{+}{M}$ radical, is made by hydrolyzing the corresponding phosphorus-containing polymer of this invention, wherein Q is the OR radical, and, if desired, reacting the hydrolyzed polymer with material selected from the group consisting of alkali metal bases, carbonates and bicarbonates. These two steps can be carried out together, for example, by saponification, that is, by contacting the polymer with an aqueous solution of alkali metal material selected from the group consisting of alkali metal hydroxides, carbonates and bicarbonates.

As can be seen, two groups of monomers are covered by the foregoing general monomer Formula II. They are the cyclic phosphates and the cyclic phosphorothioates.

The cyclic phosphates comprise cyclic alkylene phosphates, cyclic cycloalkylene phosphates and cyclic arylene phosphates. Examples of these cyclic phosphates include, reference being made in each case to both formal and trivial (or common) names:

| | |
|---|---|
| 2-methoxy-2-oxo-1,3,2-dioxaphosphetane. | Methylene methyl phosphate. |
| 2-methoxy-2-oxo-1,3,2-dioxaphospholane. | Ethylene methyl phosphate. |
| 2-methoxy-4-methyl-2-oxo-1,3,2-dioxaphospholane. | 1,2-propylene methyl phosphate. |
| 2-ethoxy-2-oxo-1,3,2-dioxaphospholane. | Ethylene ethyl phosphate. |
| 2-ethoxy-4,5-dimethyl-2-oxo-1,3,2-dioxaphospholane. | 2,3-butylene ethyl phosphate. |
| 2-ethoxy-5,5-bis(chloromethyl)-2-oxo-1,3,2-dioxaphosphane. | 2,2-bis(chloromethyl)-1,3-propylene ethyl phosphate. |
| 2-ethoxy-4-methyl-2-oxo-1,3,2-dioxaphospholane. | 1,2-propylene ethyl phosphate. |
| 2-(β-chloroethoxy)-4-methyl-2-oxo-1,3,2-dioxaphospholane. | 1,2-propylene β-chloro ethyl phosphate. |
| 2-ethoxy-2-oxo-1,3,2-dioxaphosphahexahydroindane. | 1,2-cyclohexylene ethyl phosphate. |
| 2-ethoxy-2-oxo-1,3,2-dioxaphosphaindane. | o-Phenylene ethyl phosphate. |
| 2-phenoxy-2-oxo-1,3,2-dioxaphospholane. | Ethylene phenyl phosphate. |
| 2-phenoxy-2-oxo-1,3,2-dioxaphosphaindane. | o-Phenylene phenyl phosphate. | and the like.

The cyclic phosphorothioates comprise cyclic alkylene phosphorothioates, cyclic cycloalkylene phosphorothioates and cyclic arylene phosphorothioates. Examples of these compounds include, reference being made in each case to both formal and trivial (or common) names:

| | |
|---|---|
| 2-methoxy-2-thiono-1,3,2-dioxaphosphetane. | Methylene methyl phosphorothioate. |
| 2-methoxy-2-thiono-1,3,2-dioxaphospholane. | Ethylene methyl phosphorothioate. |
| 2-ethoxy-2-thiono-1,3,2-dioxaphospholane. | Ethylene ethyl phosphorothioate. |
| 2-(β-chloroethoxy)-2-thiono-1,3,2-dioxaphospholane. | Ethylene β-chloroethyl phosphorothioate. |
| 2-phenoxy-2-thiono-1,3,2-dioxaphospholane. | Ethylene phenyl phosphorothioate. |
| 2-ethoxy-2-thiono-1,3,2-dioxaphosphane. | 1,3-propylene ethyl phosphorothioate. |
| 2-ethoxy-2-thiono-1,3,2-dioxaphahexahydroindane. | 1,2-cyclohexylene ethyl phosphorothioate. |
| 2-ethoxy-2-thiono-1,3,2-dioxaphosphaindane. | o-Phenylene ethyl phosphorothioate. |
| 2-phenoxy-2-thiono-1,3,2-dioxaphosphaindane. | o-Phenylene phenyl phosphorothioate. | and the like.

Compounds in both of these groups are available or can be made by reactions and from reactants well known in the art.

In some embodiments of this invention the monomer material comprises substantially only one cyclic phosphorus monomer and the polymer material made therefrom is homopolymer material. In other embodiments it comprises more than one cyclic phosphorus monomer, and the polymer material made therefrom is copolymer material. In still other embodiments, in addition to one or more cyclic phosphorus monomers, the monomer material comprises one or more different copolymerizable monomers, wherefore, the polymer material made therefrom is copolymer material. Typical copolymerizable monomers include epoxides such as, for instance, ethylene oxide, propylene oxide, epihalohydrins (for instance, epichlorohydrin) and the like, aldehydes and cyclized aldehydes such as, for instance, formaldehyde, paraformaldehyde, trioxane, acetaldehyde, paraldehyde, metaldehyde, and the like, and oxetanes such as, for example, trimethylene oxide, 3,3-bischloromethyl oxetane, and the like.

In the copolymer embodiments of this invention the weight ratio of the cyclic phosphorus monomer portion of the monomer material to the copolymerizable monomer portion of the monomer material can vary widely. In general it is in a range from about 1:99 to about 99:1, but lower and higher operable weight ratios are within the broader concepts of this invention.

In addition, in some of the copolymer embodiments of this invention, the monomer portions are polymerized together all at once, in which case the polymer material obtained has a random polymer structure. In other copolymer embodiments the monomer portions are polymerized together sequentially, whereby the polymer material obtained has a block copolymer structure.

The polymerization catalyst material of this invention consists essentially of at least one compound that can effect polymerization of the monomer material. In some embodiments of this invention it comprises a mixture of two or more such compounds. Examples of such a compound or mixture of compounds include a wide variety of compounds and mixtures.

For instance, one general type of substance that appears to catalyze quite broadly the desired polymerization of the cyclic phosphorus-containing monomers of this invention is the reaction product of a halide-free organomagnesium compound and at least one polyreactive compound at an equivalent mole ratio generally in a range from about 0.02 to about 1.4, and preferably in a range from about 0.1 to about 1.2. The language "equivalent mole ratio" means the ratio of (1) the mathematical product of (a) the number of moles of polyreactive compound multiplied by (b) the number of reactive sites in the molecule of the polyreactive compound to (2) the mathematical product of (a) the number of moles of organomagnesium compound multiplied by (b) the sum of the magnesium to carbon bonds and magnesium to hydrogen bonds in the molecule of the organomagnesium compound. A preferred organomagnesium compound is one represented by a formula selected from the group consisting of R"Mg, R"MgR"' and MgR"", wherein R" is any monovalent hydrocarbon radical such as, for example alkyl, alkenyl, cycloalkyl, cycloalkenyl, aryl, alkaryl, cycloalkylaryl, and the like, R"' is a monovalent radical selected from the group consisting of the H, R", OR", NR$_2$", SR", and the like radicals, and R"" is a divalent polyunsaturated hydrocarbon radical, both valences of which are associated with the magnesium atom.

Examples of a halide-free organomagnesium compound used in the preparation of this polymerization catalyst comprise dimethylmagnesium, ethylmagnesium, diethylmagnesium, triethylmagnesium, dipropylmagnesium, diisopropylmagnesium, di-n-butylmagnesium, diisobutylmagnesium, di-(tert. butyl)-magnesium, diamylmagnesium, dioctylmagnesium, dicyclohexylmagnesium, diphenylmagnesium, ethylmagnesium hydride, butylmagnesium hydride, methoxy methylmagnesium, ethoxy ethylmagnesium, magnesacyclonona-3,7-diene and the like.

The polyreactive compound is any compound, organic or inorganic, having at least two sites in its molecule for reaction with the organomagnesium compound. Thus, any compound having in its molecule at least two groups or sites that react with organomagnesium compounds to form an O—Mg, S—Mg, N—Mg, P—Mg, C—Mg, etc., bond can be used. Such polyreactive compounds comprise compounds containing at least two active hydrogens; compounds containing one active hydrogen and a member selected from the group consisting of oxygen doubly bonded to carbon (C=O), oxygen doubly bonded to nitrogen (N=O), oxygen doubly bonded to sulfur (S=O), oxygen doubly bonded to phosphorus (P=O), sulfur doubly bonded to carbon (C=S), sulfur doubly bonded to phosphorus (P=S), nitrogen doubly bonded to nitrogen (N=N), and nitrogen triply bonded to carbon (C≡N); compounds containing no active hydrogen, but having at least two members selected from the group consisting of C=O, N=O, S=O, P=O, C=S, P=S, C≡N, and N=S; and such polyreactive compounds as carbon monoxide and nitric oxide. As is well known, an active hydrogen is a hydrogen radical in a compound, organic or inorganic, which is attached to a non-metallic element other than carbon, such as, for example, oxygen, sulfur, nitrogen, phosphorus, etc., and, therefore, is active. It also can be a hydrogen radical attached to carbon under conditions such that it is a so-called acidic hydrogen or a hydrogen activated by the presence of some activating group (an electron withdrawing group) in the molecule at a position $\alpha$ to the carbon to which the active hydrogen is attached, as for example, hydrogen that is bound to a carbon $\alpha$ to a C=O group, $\alpha$ to a —COOR group, $\alpha$ to a S=O group, $\alpha$ to an N=O group, and $\alpha$ to a C≡N group or the equivalent N≡C group, etc. Thus, the active hydrogen can be that present in one of the following groups: —OH, —SH, —NH$_2$, —NHR, —CONH$_2$, =CHNO, =CHNO$_2$, =N—OH, —SO$_3$H, —SO$_2$H, —O—SO$_2$H, —SO$_2$NH$_2$, —CH—CO—, =CH—C≡N, =CHSO$_2$—, —COOH, and the like.

Exemplary of active hydrogen compounds containing at least two active hydrogens, that can be used as polyreactive compounds for reaction with organomagnesium compounds to form these catalysts comprise water; alkylene glycols and cycloaliphatic polyols, such as, for example, ethylene glycol, trimethylene glycol, tetramethylene glycol, pentamethylene glycol, glycerol, pentaerythritol, trimethylol propane, 2-butene-1,4-diol, 2-butyne-1,4-diol, 1,3-cyclohexanediol, 1,4-cyclohexanediol, and the like; polyhydric phenols such as, for example, resorcinol, hydroquinone, pyrocatechol, bisphenol A (p,p'-isopropylidenediphenol), and the like; ammonia; amines including alkylamines such as, for example, methylamine, ethylamine, n-butylamine, amylamines, and the like, arylamines such as, for example, aniline and the like, aralkylamines such as, for example, benzylamine and the like, cycloalkylamines such as, for example, cyclohexylamine and the like, diamines such as, for example, ethylenediamine, diethylene triamine, triethylene tetramine, hexamethylene diamine, p-phenylenediamine, piperazine and the like; hydroxylamine; aminoalcohols such as, for example, ethanolamine, tetrakishydroxyethyl ethylene diamine, and the like; hydrazines such as, for example, hydrazine, phenyl hydrazine, and the like; amides such as, for example, urea, thiourea, acetamide, malonamide, and the like; sulfenamides and sulfonamides, such as, for example, p-toluene sulfonamide and the like; hydrogen sulfide; dimercaptans such as, for example ethanedithiol, 1,5-pentanedithiol, dithioresorcinol, and the like; 2-mercaptoethylamine; dialkyl sulfides; dialkyl disulfides; dialkyl polysulfides; sulfones and hydroxysulfones, such as, for example, dibutylsulfone, hydroxyethyl methyl sulfone, and the like; sulfoxides such as, for example, dibutyl sulfoxide, dimethyl sulfoxide, and the like; acids such as sulfuric acid, sulfurous acid, phosphorus acid, phosphoric acid, carbonic acid, acetic acid, oxalic acid, phthalic acid, ethylenediamine tetraacetic acid, $\alpha,\alpha$-dioctyl ethylenediamine diacetic acid, malonic acid, succinic acid, adipic acid, and the like; ketones such as, for example, acetone, diacetyl, dibenzoylmethane, 2-hydroxyethyl methyl ketone, acetylacetone, acetonylacetone, diacetylacetone, acetophenone, and the like; esters such as, for example, malonic esters, for instance, methyl malonate, ethyl malonate, and the like, acetoacetic acid, ethyl acetoacetate, and the like; nitro and nitroso alkanes, such as for example, nitromethane, nitroethane, nitrosomethane, and the like; nitriles and isocyanides, such as acetonitrile, hydracrylonitrile (3-hydroxypropionitrile), and the like; the hydrate of formaldehyde; (HNS)$_4$; and the like. Many other active hydrogen compounds wherein there are present in the molecule at least two active hydrogens can be used.

Exemplary of other polyreactive compounds that can be reacted with an organomagnesium compound to form a halide-free organomagnesium polyreactive compound catalyst of this invention are compounds containing one active hydrogen and one C=O group, as for example, benzoic acid; compounds containing one active hydrogen and one N=O group, such as nitrosophenol; compounds containing one active hydrogen and one S=O group, such as benzene sulfinic acid; compounds containing one active hydrogen and one P=O group, as for example, dimethyl hydrogen phosphite; compounds containing one active hydrogen and one C=S group, such as dithiobenzoic acid; compounds containing one active hydrogen compound and one P=S group, such as esters of dithiophosphoric acid; compounds containing one active hydrogen and one C≡N group, such as hydrogen cyanide; compounds containing at least two C=O groups and no active hydrogen, such as, for example, carbon dioxide, glyoxal, the dialkyl esters of oxalic acid, and the like; compounds containing at least two N=O groups and no active hydrogen, as for example, nitrobenzene, nitrogen dioxide, and the like; compounds containing at least two S=O groups and no active hydrogen, such as sulfur dioxide; compounds containing at least two P=O groups and no active hydrogen, such as, for example, phosphorous pentoxide, tributyl phosphate, and the like; compounds containing at least two C=S groups and no active hydrogen, such as carbon disulfide; compounds containing at least two P=S groups and no active hydrogen, as for example, phosphorous pentasulfide; compounds containing at least two N=S groups and no active hydrogens, such as nitrogen sulfide (N$_4$S$_4$); compounds containing at least two C≡N or N≡C groups; and no active hydrogen, as for example, cyanogen, phthalyl nitriles, phenylene isocyanide, and the like; compounds containing at least one N=N group, as for example, azobenzene; compounds containing at least one C=O group and at least one N=O group, such as, for example, nitrosobenzaldehyde, nitrosobenzophenone, and the like.

The exact nature of the reaction product of the organomagnesium compound with the polyreactive compound is not known. However, in most cases it is essential that the reaction product possess magnesium to carbon bonds equivalent generally to about 0.2–1.8 hydrocarbon groups per magnesium atom, and preferably to about 0.4–1.2.

The quantity of polyreactive compound reacted with the organomagnesium compound depends on the polyreactive compound, the organomagnesium compound, etc., and to some extent upon the diluent, temperature, the monomer being polymerized, etc. In general it is such as to give an equivalent mole ratio in a general range from about 0.02 to about 1.4, in a preferred range from about 0.1 to about 1.2 and usually in a range from about 0.2 to about 0.8. Thus, in the case of a difunctional polyreactive compound such as water, one would use from about 0.02 to about 1.4 moles of water per mole of organomagnesium compound of the formula R″R″Mg or of the formula R″HMg, and preferably from about 0.1 to about 1.2 moles of water per mole of said magnesium compound. If the polyreactive compound contains more than two reactive sites and the organomagnesium compound is of one of the specified formulas, the amount of the polyreactive compound is reduced proportionately. In the case of magnesium compounds having the formula R"MgR"' where R" is organo and R"' is other than H and R", the actual mole ratio of polyreactive compound to magnesium compound is lower, for a difunctional polyreactive compound, for example, being in the general range from about 0.01 to about 0.7. At equivalent mole ratios above or below the general range of about 0.02–1.4, the polymerization reaction is retarded or otherwise adversely affected, resulting for example in a liquid polymer product instead of a high molecular weight solid polymer product.

Any desired procedure can be used for reacting the organomagnesium compound with the polyreactive compound. In one procedure the organomagnesium compound and the polyreactive compound are prereacted by adding the polyreactive compound to a solution or dispersion of the organomagnesium compound in a liquid having no adverse effect on this reaction and preferably on the polymerization reaction of this invention, including a liquid which forms a complex with the organomagnesium compound. Representative liquids having no such adverse effect are liquid hydrocarbons, examples of which include liquid aliphatic straight chain and branched hydrocarbons such as n-hexane, n-heptane, and the like, liquid aromatic hydrocarbons such as benzene, toluene, and the like, liquid cycloaliphatic hydrocarbons such as hexane, methylcyclohexene, and the like, a liquid ether, examples of which include diethyl ether, diisopropyl ether, and the like, or a mixture of such liquids. These organomagnesium-polyreactive compound reaction products can be used immediately or aged, or if desired, heat-treated in some cases. In another procedure the reaction of the organomagnesium compound and the polyreactive compound is carried out by reacting the two reagents in situ in the polymerization reaction mixture. This can be accomplished by adding the polyreactive compound to the monomer material being polymerized and then adding the organomagnesium compound, or by adding the two reagents to the polymerization reaction mixture simultaneously.

In some cases it has been found advantageous to react the organomagnesium-polyreactive compound reaction product with a complexing agent such as, for example, an ether such as diethyl ether, tetrahydrofuran, dioxane, etc., a thioether, an aminoether, a tertiary amine, a tertiary phosphine and the like. In one procedure the organomagnesium compound is reacted first with the polyreactive compound, and then with the complexing agent. In another procedure the complexing agent is added to the liquid medium in which the polymerization is to be carried out and which contains the organomagnesium-polyreactive compound reaction product. In still another procedure the complexing agent is present while making the catalyst in situ. In yet another procedure the organomagnesium compound is reacted first with the complexing agent, and then with the polyreactive compound. Indeed, when the organomagnesium compound is dissolved in diethyl ether or the like a complex of diethyl ether and the organomagnesium compound is formed. The quantity of complexing agent reacted with the catalyst varies widely with the nature of the complexing agent. Thus, with weak complexing agents such as diethyl ether and dioxane, from 0.1 to 100 or more moles of complexing agent per mole of magnesium are used, and with stronger complexing agents such as tertiary amines, phosphines, some cyclic ethers etc. from 0.1 to about 10 moles of complexing agent per mole of magnesium and preferably from about 1 to about 3 moles of complexing agent per mole magnesium are used. In the case of the weaker complexing agents such as diethyl ether the complexing agent can be used as the sole component of the liquid reaction medium or diluent for the polymerization reaction.

Another general type of compound that catalyzes the desired polymerization of the monomer material of this invention is an organozinc product such as that obtained by the reaction of a dihydrocarbon zinc compound with a polyfunctional compound selected from the group consisting of water, nonaromatic polyols having at least one carbon between the COH or hydroxycarbyl groups, and polyhydric phenols, the mole ratio of the polyfunctional compound to the dihydrocarbon zinc compound being in a range from about 0.2 to about 1.2. The dihydrocarbon zinc compound is an organozinc compound having the formula RZnR', wherein R and R' are hydrocarbon radicals that can be either alike or different. Exemplary of dihydrocarbon zinc compounds are dimethylzinc, methyl ethylzinc, diethylzinc, dipropylzinc, diisopropylzinc, di-n-butylzinc, diisobutylzinc, di-tert-butylzinc, diamylzinc, di-octylzinc, dicyclohexylzinc, dicyclopentadienylzinc, diphenylzinc, and the like. Representative of the nonaromatic polyols wherein there is at least one carbon atom between the hydroxycarbyl groups include trimethylene glycol, tetramethylene glycol, pentamethylene glycol, 2-butene-1,4-diol, 2-butyne-1,4-diol, 1,3-cyclohexanediol, 1,4-cyclohexanediol, and the like. Exemplary of the polyhydric phenols are resorcinol, hydroquinone, catechol, and the like. The preferred mole ratio of polyfunctional compound to dihydrocarbon zinc compound is in a range from about 0.4 to about 1.

Another general type of compound that catalyzes the desired polymerization of the cyclic phosphate monomer material of this invention, but not generally the cyclic phosphorothioate monomer material of this invention is the organoaluminum compound. Preferred examples of such a compound include organoaluminum-water reaction products such as disclosed in the U.S. patent, No. 3,135,-705, to Vandenberg, the catalyst disclosures of which are incorporated herein by reference.

Still another general type of compound that catalyzes the desired polymerization of the cyclic phosphate monomer material of this invention, but again not generally the cyclic phosphorothioate monomer material of this invention, is the alkyl magnesium halide type compound or Grignard reagent. Examples of this type of compound include n-octyl magnesium bromide, ethyl magnesium chloride and the like.

Any quantity from a minor catalytic quantity up to a large excess can be used to catalyze the polymerization reaction in accordance with this invention, but, in general, it is within a range from about 0.2 to about 10 mole percent based on the monomer material being polymerized and preferably is within the range from about 1 to about 5 mole percent. The amount used depends in part on such factors as monomer purity, diluent or liquid reaction medium purity, etc., less pure monomer material and liquid reaction medium requiring more catalyst material to destroy reactive impurities.

The polymerization reaction of this invention is carried out any desired way. It is performed on either a batch or a continuous basis with the catalyst material being added all at once or in increments during the polymerization, or continuously throughout the polymerization. If desired, the monomer material is added gradually to the polymerization reaction mass. It is carried out as a bulk polymerization process, in some cases at the boiling point of the monomer material (reduced or raised to a convenient level by adjusting the ambient pressure) so as to remove heat of reaction. It is also carried out in a fluid medium or diluent having no substantially adverse effect on the polymerization reaction. Any material inert under the polymerization reaction conditions and fluid under said conditions can be used. Preferably it is a liquid under said conditions and preferably the total polymer product or at least one polymer product formed in the polymerization reaction is substantially insoluble in it, while the monomer material is substantially soluble in it. Preferred examples of such a fluid include the normally liquid dialkyl, aryl and cycloalkyl ethers such as, for instance, diethyl ether, dipropyl ether, diisopropyl ether, and the like, the normally liquid aromatic hydrocarbons such as, for instance, benzene, toluene, xylene, and the like, and the normally liquid saturated branched and unbranched aliphatic hydrocarbons and cycloaliphatic hydrocarbons, such as, for instance, n-heptane, cyclohexane, and the like. A mixture of such liquids can be used and in many cases is preferable. The polymerization reaction of this invention can also be carried out with additives such as, for example, antioxidants, carbon black, zinc stearate, some accelerators and other curatives, and the like, in the reaction mass.

The polymerization process in accordance with this invention can be carried out over wide temperature and ambient pressure ranges. In general, it is carried out in a temperature range from about −80 to about 150° C., preferably within a range from about −50 to about 120° C., and usually substantially in a range from −30 to 100° C. In general, the polymerization reaction is conducted at atmospheric pressure, but superatmospheric pressure up to several hundred pounds, including autogenous ambient pressure, can be employed, if desired, and subatmospheric pressure can be employed, if desired.

The reaction time or period can vary, being dependent on such variables as purity of monomer material and of fluid reaction medium, quantity of fluid reaction medium and the like. Generally the quantity of fluid reaction medium is sufficient to establish and maintain the reaction mixture in a fluid condition substantially throughout the reaction period. Accordingly, the reaction period is generally in a range from about one minute to about a thousand hours, and preferably in a range from about 10 minutes to about 20 hours, although greater and lesser times are within the broader concepts of this invention.

The polymer product or products, as the case might be, is or are separated from the reaction mixture by conventional procedures, solvent precipitation being a particularly preferred procedure.

This invention is further illustrated by the following examples of various aspects of this invention, including preferred specific embodiments thereof. This invention is not limited to these embodiments. In these examples all parts and percentages are by weight except where the contrary is stated. The term "mole" as used herein means the quantity, expressed in parts, of the indicated substance numerically equal to the molecular weight of that substance. The term "ether," when employed alone in the examples, refers to diethyl ether. The reduced specific viscosity (RSV) values generally are determined with a conventional Ubbelohde viscometer on 0.1% solutions of the polymer products at 25° C., unless another temperature is specified, the solvent being dimethylformamide unless indicated to the contrary as by an abbreviation of the solvent used, CF standing for chloroform and CN standing for α-chloronapthalene.

EXAMPLES 1–3

These examples illustrate organophosphorus containing polymer products of this invention made from cyclic phosphorothioate monomer material, and a process for making them.

In each of these examples the monomer material consists essentially of 2-phenoxy-2-thiono-1,3,2-dioxaphospholane.

The specific polymerization catalyst material employed in each example is identified in the following Table I. Generally the polymerization catalyst material of these examples is a reaction product of a dialkylmagnesium and a polyreactive compound. It is made under nitrogen and with the aid of glass beads by admixing at 0° C. a 0.5 molar solution of the dialkylmagnesium in ether with the polyreactive compound at a particular mole ratio, and then agitating the reaction mixture 18–20 hours at 30° C. In two of the examples the reaction product is heat treated by establishing and maintaining for 19 hours the reaction product at 90° C.

In Table I the reaction product in each example is identified by whether or not it is heat treated, "HT" being employed if it is, no designation being present if it is not, followed by an identification of the dialkylmagnesium (dialkyl Mg), a number which indicates the mole ratio of the polyreactive compound to the dialkylmagnesium at the time of admixing the two, and the identification of the polyreactive compound.

The liquid reaction medium in each example is the ether which accompanies the catalyst material. It amounts to 5.6 parts for each 0.004 mole (dialkyl Mg basis) of catalyst used.

The general procedure followed in each of these Examples 1–3 for effecting the polymerization reaction is as follows, reference being made to Table I for the specific reaction conditions involved in each example. A batch polymerization reactor filled with nitrogen is charged with the indicated quantity of monomer material. After establishing the vessel and its contents at the indicated reaction temperature, a quantity of ether solution of catalyst, the quantity being selected to give either the indicated mole (dialkyl Mg basis) amount in Examples 1 and 3 and one-half the indicated mole (dialkyl Mg basis) amount in Example 2 of catalyst, is injected into the vessel. The resulting reaction mixture is then agitated for the specified time period or periods at the indicated temperature or temperatures, and with the ambient pressure being atmospheric. In Example 2 the remaining amount of catalyst in ether is introduced into the vessel after 19 hours of reaction time.

At the end of the reaction period acetylacetone, about 5 parts for each 10 parts of monomer material initially charged to the reactor, is introduced into the reactor to stop the polymerization reaction.

Polymer material is separated from the reaction mixture by adding 5–10 volumes of the precipitating liquid identified in Table I, and agitating the mixture until precipitation is complete. The precipitate is settled and then the mother liquor is removed therefrom by decantation. An equal volume of fresh precipitating liquid is admixed with the precipitate, the mixture is agitated, the precipitate settled and the precipitating liquid removed therefrom by decantation. The precipitate is washed once more in the same way with fresh precipitating liquid containing the antioxidant 4,4′-thiobis(6-t-butyl-m-cresol) at a 0.2% concentration. The washed solids are then filtered and the filter cake placed in a vacuum of 0.4 millimeter of mercury for 16 hours at 20–25° C. to remove residual liquid.

The liquid-free filter cake thus obtained is the end product, a polymer product, in Example 1. Typical properties of this product are reported in Table I.

In Examples 2 and 3 the liquid-free filter cake is extracted first with acetone, then with benzene, and the remaining solids thereafter are placed in a 0.4 millimeter of mercury vacuum for 16 hours at 20–25° C. to remove residual liquid. The solids thus obtained constitute a polymer product of this invention, which product is referred to in the table as the "insoluble" product. Typical properties of this polymer product are given in the table.

In Examples 2 and 3 the acetone and benzene extracts are combined and stripped of liquid. The resulting solid product is placed in a 0.4 millimeter of mercury vacuum for 16 hours at 20–25° C. to remove residual liquid. The product thus obtained is another polymer product of this invention, which product is referred to in the table as the "soluble" product. Typical properties of this product are set forth in Table I.

Work-up of the polymer products is substantially the same as in Example 1 with methanol being the precipitat-

TABLE I

| | Polymerization reaction conditions | | | | | Polymer products | | | | | | |
|---|---|---|---|---|---|---|---|---|---|---|---|---|
| | | | | | | Insoluble | | | | Soluble | | |
| Ex. No. | Qty. of monomer (parts) | Catalyst | Mole qty. of cat. | Reac. time (hrs.) | Reac. temp. (°C.) | Precp. liquid | Appearance | X-ray talinity | RSV | Precp. liquid | Appearance | X-ray | RSV |
| 1 | 10 | Diethyl Mg-O.6NH$_3$. | 0.004 | {19 {25 | 30} 50} | Ether | Soft white mattable solid. | Moderate | 1.4CF | | | | |
| 2 | 25 | (HT)Di(n-octyl) Mg-0.4NH$_3$. | 0.008 | 98 | 30 | Methanol | Soft flexible film. | Low | >1.4 | Acetone | Strong orientable clear film. | High | 2.2 |
| 3 | 10 | do | 0.004 | 117 | 30 | Methanol | White tough solid. | Low | | | Tough orientable solid. | do | 2.7 |

The insoluble polymer product of Example 1 typically becomes rubbery at 65–70° C.

ing liquid. Typical properties of these products are presented in Table II.

TABLE II

| | | Polymerization reaction conditions | | | | | |
|---|---|---|---|---|---|---|---|
| | | Reac. time (hrs.) | Reac. temp. (°C.) | Liq. reaction med. | | Polymer product | |
| Ex. No. | Catalyst | | | Added Separately | Parts | Appearance | X-ray xtalinity | RSV |
| 4 | Di(n-octyl)Mg | 19 | 0-3 | Ether | 29 | White powder and film. | Moderate | 0.17 |
| 5 | (HT) diethyl Mg-0.4NH$_3$ | 43 | 0-3 | do | 31 | White powder. | None | 0.20 |
| 6 | do | 19 | 30 | None | | White rubber. | None | 0.20 0.36(CF) |

Differential thermal analysis of the insoluble product of Example 2 typically gives a melt range of 186–205° C. and $\Delta H_f = 1.2$ calories per gram.

Differential thermal analysis of the soluble product of Example 2 typically gives a melt range of 34–66° C. and $\Delta H_f = 2.7$ calories per gram.

Differential thermal analysis of the soluble product of Example 3 typically gives a melt range = 33–68° C. and $\Delta H_f = 5.4$ calories per gram.

The soluble product of Example 3 can be oriented by cold drawing. The soluble product typically chemically analyzes as follows:

Calc'd (percent): C, 44.4; H, 4.2; P, 14.3; S, 14.8.
Found (percent): C, 44.4; H, 4.5; P, 14.7; S, 15.2.

The crystalline polymer products of these examples, whether oriented or nonoriented, are useful as films, fibers and other shaped articles.

EXAMPLES 4–6

These examples illustrate cyclic phosphorus containing polymer products of this invention made from a different phosphorothioate monomer material, and a process for making them.

The phosphorothioate monomer material employed in these examples consists essentially of 2-methoxy-2-thiono-1,3,2-dioxaphospholane. The quantity involved in each example is 10 parts.

The polymerization catalyst is indicated in the following Table II. The polymerization catalysts based on the specific reaction product of a dialkylmagnesium and a polyreactive compound are identified in Table II in the same fashion as in Examples 1–3 and are prepared in the same manner as described in Examples 1–3.

The quantity of catalyst in each example is 0.004 mole (dialkyl Mg basis).

The reaction liquid medium or diluent in each example is ether. It comprises the 5.6 parts of ether which accompanies the catalyst plus in Examples 4 and 5 the separately added quantities of ether indicated in the table.

The polymerization reaction procedure in each of these Examples 4–6 is the same as described in Examples 1–3 with pertinent reaction conditions for each example being set forth in the following Table II.

The polymer product of Example 4 typically has on differential thermal analysis a melt range of 42–57° C. with a melting point of 57° C. and $\Delta H_f = 3.7$ calories per gram.

The polymer product of Example 5 typically has on differential thermal analysis a melt range of 44–66° C. with a melting point of 65° C. and $\Delta H_f = 2.2$ calories per gram.

The polymer product of Example 6 typically is soluble in methylene dichloride, dioxane, chloroform, acetone, dimethylformamide and dimethylsulfoxide. It has an RSV in acetone of 0.22 and an RSV in hexamethyl phosphoramide of 0.14.

The polymer product of Example 6 is purified by precipitation from methylene dichloride with benzene denatured ethanol as the precipitating liquid. The purified product is soluble in methylene dichloride and in acetone. It forms a highly swollen gel in benzene.

The polymer products of these examples have utility as stabilizer additives for synthetic resins such as, for example, polyolefin resins, for instance, crystalline polypropylene resins, and the like.

EXAMPLES 7–10

These examples illustrate cyclic phosphorus containing polymer products of this invention made from cyclic alkylene haloalkylphosphorothioate monomer material, and a process for making them.

The cyclic alkylene haloalkylphosphorothioate monomer material in these examples consists essentially of 2-($\beta$ - chloroethoxy)-2-thiono-1,3,2-dioxaphospholane. The quantity of monomer in each example is 10 parts.

The catalyst in each example is indicated in the following Table III. The organomagnesium-polyreactive compound reaction product catalysts are made as described in Examples 1–3. However, in Example 9 the solution of catalyst and ether is a 0.15 molar solution.

The reaction medium in each example is ether. It is made up of the ether which accompanies the catalyst (in Examples 7, 8 and 10 the quantity is 5.6 parts while in Example 9 the quantity is 16.6 parts for each 0.004 mole charge of catalyst) and in Examples 7 and 8, the additional ether separately added, the quantities of which are shown in the table.

In general the reaction procedure followed in each example is the same as that described in Examples 1–3. Pertinent reaction conditions are indicated in the table. The mole quantities of catalyst are on a dialkyl Mg basis. In Examples 7, 8 and 9 one-half of the catalyst is introduced into the polymerization reactor at the beginning of the reaction, and then the remaining half is introduced after 19 hours of reaction time.

In general the polymer product separation procedure in each example is the same as in Example 1. The precipitating liquid in each example is methanol.

Typical properties of the polymer product in each example are set forth in Table III.

product being as indicated in the preceding examples. The quantity of catalyst employed is 0.004 mole (dialkyl Mg basis), this quantity of catalyst being present in a 0.5 molar solution with ether being the solvent.

The liquid reaction medium is the ether which accompanies the catalyst. The quantity of ether involved is 5.6 parts.

The polymerization reaction procedure followed to make the polymer product is generally that described in Examples 1–3. The total reaction time is 44 hours with the first 19 hours being at a temperature of 30° C. and the remaining time being at a temperature of 50° C.

The polymer product separation procedure is generally

TABLE III

| | | | | Liquid reaction medium | | Polymer product | | |
|---|---|---|---|---|---|---|---|---|
| Ex. No. | Catalyst | Mole qty. of cat. | Reac. time (hrs.) | Reac. temp. (°C.) | Added separately | Parts | Appearance | X-ray talinity | RSV |
| 7 | Diethyl Mg | 0.008 | 70 | 0–3 | Ether | 29 | Tacky rubber | None | 0.09 |
| 8 | (HT) diethyl Mg-0.4NH₃ | 0.008 | 42 | 0–3 | do | 29 | Gel-like rubber | do | 0.10 |
| 9 | do | 0.008 | 117 | 30 | | | do | do | 0.06(CF) |
| 10 | (HT) Di (n-octyl)Mg-0.6NH₃ | 0.004 | 19 | 0–3 | | | Tacky opaque rubber, low odor. | do | |

In both Examples 9 and 10, the methanol insoluble product is separated by acetone extraction. Typically in each case a major portion of the product dissolves in the acetone. The acetone insoluble portion of the product and the acetone solution are separated by filtration. The acetone insoluble material is placed in a vacuum of 0.4 millimeter of mercury for 16 hours at 20–25° C. The acetone soluble material is recovered by stripping off the acetone and then removing residual liquid by placing the remaining solid in a vacuum of 0.4 millimeter of mercury for 16 hours at 20–25° C.

In Example 9, the acetone insoluble polymer product typically is a hard tough solid having moderate crystallinity by X-ray. By differential thermal analysis it tyically has a melt range of 179–209° C., a melting point of 205° C. and $\Delta H_f$=13.1 calories per gram.

In Example 9, the acetone soluble polymer product typically is a rubber, has a typical RSV=0.09, is insoluble in dimethylformamide at 25° C., and is about 60% insoluble in dimethylformamide at boiling point with the insoluble portion being a white fibrous solid.

In Example 10, the acetone insoluble polymer product typically is a white powder, insoluble in dimethylformamide, and amorphous by X-ray.

In Example 10 the acetone soluble polymer product typically is a low odor rubber, is amorphous by X-ray and has an RSV=0.10.

The polymer products of these examples are self-extinguishing. These polymer products, accordingly, have utility as additives for thermoplastic resins and the like to improve flame resistance, stability, low temperature properties, and the like.

EXAMPLE 11

This example illustrates a cyclic phosphorus containing polymer product of this invention made from cyclic alkylene arylphosphate monomer material, and a process for making it.

The alkylene aryl phosphate monomer material (10 parts) of this example consists essentially of 2-phenoxy-2-oxo-1,3,2-dioxaphospholane.

The catalyst material consists essentially of (HT) diethyl Mg—0.4 NH₃, the nomenclature being as in the preceding examples and the preparation of this reaction the same as that described in Example 1, the precipitating liquid being ether.

The polymer product thus obtained typically is a soft somewhat rubbery solid with an RSV=>1.4. It has an X-ray crystallinity pattern indicative of moderately crystalline polymer material. The product is soft, white and waxy at 60° C., is soft and waxy at 260° C., and on cooling to 20–25° C. is brittle. The product is soluble in chloroform.

EXAMPLES 12–15

These examples illustrate phosphorous containing polymer products of this invention made from cyclic alkylene alkyl phosphate monomer material, and a process for making them.

The monomer material in these examples consists essentially of 2-ethoxy-2-oxo-1,3,2-dioxaphospholane. In each example the quantity of monomer material is 10 parts.

The catalysts are identified in the following Table IV. The magnesium catalysts are made as described in Examples 1–3. The aluminum catalysts are made as described in U.S. Pat. No. 3,135,705, the catalyst in each case being in a 0.5 molar solution of 50:50 by weight ether and heptane. In each example the quantity of catalyst is 0.004 mole (dialkyl Mg or trialkyl Al basis).

The liquid reaction medium or diluent in each case is the liquid which accompanies the catalyst. In the case of each magnesium catalyst it is either. In the case of the aluminum catalyst it is ether and heptane. The quantity of liquid in each example is 5.6 parts.

The procedure followed in carrying out the polymerization reaction in each example is substantially the same as described in Examples 1–3 with a reaction period in each case of 19 hours and a reaction temperature as indicated in Table IV.

The procedure for separating a polymer product from the reaction mixture in each example is as follows.

An ether insoluble polymer product is separated from the reaction mixture by admixing 5–10 volumes of ether with the reaction mixture, collecting the solid precipitate, washing it twice with fresh ether and then with ether containing in solution 4,4'-thiobis(6-t-butyl-m-cresol) at a 0.2% concentration. The washed solids are placed in a vacuum of 0.4 millimeter of mercury for 16 hours at 80° C.

Typical properties of the polymer products of these examples are presented in Table IV.

TABLE IV

| Ex. No. | Polymerization Reaction Conditions | | Polymer product | | |
|---|---|---|---|---|---|
| | Catalyst | Reac. temp. (° C.) | Appearance | X-ray xtalinity | RSV |
| 12 | (HT)Di(n-octyl)Mg-0.4NH₃ | 30 | Tacky rubber | None | 0.27 |
| 13 | do | 78 | do | | 0.12 |
| 14 | Triisobutyl Al·0.5 H₂O | 0 | | None | 0.11 |
| 15 | Triethyl Al·0.5 H₂O-0.5 acetylacetonate | 0 | Rubber | do | 0.07 |

The polymer products of these examples are nonburning. They have utility, therefore, as additives in synthetic resins and the like to improve flame resistance, low temperature properties, stability, and the like.

EXAMPLE 16

This example illustrates the preparation of a cyclic-phosphorus polymer product of this invention from a different alkylene alkyl phosphate monomer material, and a process for its preparation.

The cyclic phosphorous monomer material employed in this example consists essentially of 2-methoxy-2-oxo-1,3,2-dioxaphospholane.

The catalyst material consists essentially of di-n-octyl magnesium-0.4 NH₃ reaction product made as described in Examples 1–3. The quantity used is 0.008 mole (dioctyl Mg basis).

The liquid reaction medium is either. It is the ether in which the catalyst material is dissolved. The quantity of ether involved is 5.6 parts.

The procedure for carrying out the polmerization reaction is the same as that described in Examples 1–3. The reaction time is 20.5 hours and the reaction temperature is 65° C.

Separation of an ether insoluble polymer product from the reaction mixture is made by the same procedure as that employed in Examples 12–15 with ether being the precipitating liquid.

The resulting polymer product is typically a tacky rubber. It has utility as an additive for synthetic resins and the like to improve flame resistance and as a plasticizer.

EXAMPLE 17

This example illustrates a cyclic phosphorus polymer product of this invention made from a still different cyclic alkylene alkyl phosphate monomer material, and a process for making the product.

The monomer material consists essentially of 2-ethoxy-4,5-dimethyl-2-oxo-1,3,2-dioxaphosolane.

The catalyst material consists essentially of heat treated di(n-octyl) Mg—0.4NH₃ reaction product made as described in Examples 1–3.

The liquid reaction medium consists essentially of the ether furnished with the catalyst material.

The polymerization reaction procedure is generally the same as that described in Examples 1–3. The quantity of monomer material employed is 10 parts, the quantity of catalyst material is 0.004 mole (dialkyl Mg basis), and the quantity of liquid reaction medium is 5.6 parts. The reaction time is 144 hours with the reaction temperature being 0° C. for the first 48 hours and 30° C. for the next 96 hours.

An ether soluble product is separated from the reaction mixture by admixing 5–10 volumes of ether with the reaction mixture, removing the liquid portion of the thus diluted reaction mixture, stripping off most of the ether from the liquid portion, and then admixing 10 volumes of heptane with it. The resulting precipitate is collected, dissolved in toluene and then precipitated again with heptane. The solids are collected and the precipitation procedure repeated twice. The precipitate thus obtained is washed twice with a 50:50 mixture of toluene and heptane, and then placed in a vacuum of 0.4 millimeter of mercury for 16 hours at 80° C.

The product thus obtained typically is a hard brittle solid with an RSV of 0.01. This product is useful as a material of construction for shaped articles and the like.

EXAMPLE 18

This example illustrates still another cyclic phosphorus polymer product of this invention and a process for making it from haloalkylene alkyl phosphate monomer material.

The monomer material in this example consists essentially of 2-ethoxy-5,5-bis(chloromethyl)-2-oxo-1,3,2-dioxaphosphane.

The catalyst material consists essentially of (HT) di(n-octyl) Mg—0.4NH₃ reaction product prepared substantially as described in Examples 1–3.

The liquid reaction medium consists essentially of ether.

The polymerization reaction procedure is the same as that described in Examples 1–3. The quantity of monomer material employed is 10 parts, the quantity of catalyst material is 0.004 mole (dialkyl Mg basis), and the quantity of liquid reaction medium is 35.6 parts with 5.6 parts accompanying the catalyst material, and 30 parts being added separately to the polymerization reactor. The reaction time is 144 hours and the reaction temperature is 30° C.

An ether soluble polymer product is separated from the polymerization reaction mixture by the procedure described in Example 17. The ether soluble polymer product thus obtained is typically a slightly yellow powder. It has utility as an additive to polymers such as poly(vinyl chloride), polyethylene, polypropylene and the like to improve flame resistance.

EXAMPLES 19–28

These examples illustrate cyclic phosphorus polymer products of this invention made from cyclic cycloalkylene alkyl phosphate monomer material, and a process for making these products.

The monomer material in these examples consists essentially of 2-ethoxy-2-oxo-1,3,2-dioxaphosphahexahydroindane. In each example the quantity used is 10 parts.

The catalyst in each example is identified in the following Table V. The catalysts indicated in the table as the reaction products of dialkyl magnesium and polyreactive compounds are prepared as described in Examples 1–3. The organoaluminum catalysts are made as indicated in Examples 12–15. In each Example 19–28 the quantity involved in each charge of catalyst to the reactor is 0.004 mole (dialkyl Mg or trialkyl Al basis).

The reaction liquid medium comprises the liquid which accompanies the catalyst, 5.6 parts for each 0.004 mole charge of catalyst, and the separately added ether or other liquid specified in Table V.

The polymerization reaction procedure in each of the examples is generally that described in Examples 1–3. Specific reaction conditions are set forth in the table. In Examples 26 and 28 the initial charge of catalyst is 0.004 mole. After 24 hours (in Example 26) and 20 hours (in Example 28) of reaction time at 0° C., an additional 0.004 mole charge of catalyst is made and reaction is continued for the indicated time. In Example 28, after a reaction time of 135 hours at 0° C., the temperature is changed to 30° C. and the reaction is continued for 25 hours. Finally, in Example 28 the temperature is increased to 50° C. and the reaction continued for 50 more hours.

The separation of polymer products from the polymerization reaction mixture comprises the procedure described in Examples 12–15 and the procedure described in Example 17.

Typical properties of the polymer products thus obtained are presented in Table V.

TABLE V

| | | Polymerization reaction conditions | | | | Polymer Products | | | | | |
|---|---|---|---|---|---|---|---|---|---|---|---|
| | | | | | Liq. Reaction Med. | Ether Insoluble Product | | | Ether Soluble Product | | |
| Ex. No. | Catalyst | Mole qty. of cat. | Reac. time (hrs.) | Reac. temp. (° C.) | Added separately / Parts | Appearance | X-ray xtalinity | RSV | Appearance | X-ray xtalinity | RSV |
| 19 | (HT) Di (n-octyl) Mg-0.4NH₃ | 0.004 | 19 | 30 | None | Brittle, adhering solid. | None | 0.17 | Hard adhering solid. | | 0.08 |
| 20 | do | 0.004 | 19 | 0 | Ether / 30 | Tacky adhering, soft to hard solid. | | 0.28 | | | |
| 21 | do | 0.004 | 19 | 0 | Toluene / 37 | Hard, tacky solid. | None | 0.34 | | | 0.16 |
| 22 | do | 0.004 | 19 | 0 | Methylene dichloride / 60 | Hard, white, tacky rubber. | do | 0.40 | Brittle adhering solid. | None | 0.16 |
| 23 | (HT) diethyl Mg-0.4-NH₃ | 0.004 | 43 | 0 | None | Hard, adhering tacky solid. | do | 0.14 | | | 0.14 |
| 24 | Di (n-octyl)Mg | 0.004 | 19 | 0 | do | Hard brittle solid. | do | 0.14 | Soft solid | | 0.14 |
| 25 | Diethyl Mg | 0.004 | 19 | 0 | do | Tacky, hard solid. | do | 0.22 | Hard, adhering film. | | 0.07 |
| 26 | Triisobutyl Al·0.5H₂O | 0.008 | 44 | 0 | do | Hard, tough, white solid. | None | 0.17 | Adhering, brittle solid. | None | 0.14 |
| 27 | do | 0.004 | 19 | 0 | do | Hard, tacky resin. | | 0.03 | Soft, brittle resin. | do | 0.02 |
| 28 | Triethyl Al·0.5H₂O-0.5 acetylacetonate. | 0.008 | 155 / 25 / 22 | 0 / 30 / 50 | do / do | Tough, hard rubber. | None | 0.02 | | do | 0.02 |

The polymer products of these examples have utility as additives for isotactic polypropylene to improve the after laundering heat stability thereof when such is used as fiber in washable fabrics.

EXAMPLE 29

This example illustrates a cyclic phosphorous polymer product of this invention made from cyclic arylene alkyl phosphate monomer material, and a process for making the product.

The monomer material in this example consists essentially of 2-ethoxy-2-oxo-1,3,2-dioxaphosphaindane. The quantity used in the polymerization reaction is 10 parts.

The catalyst material consists essentially of HT di(n-octyl) Mg—0.4NH₃ reaction product prepared as described in Examples 1–3. The quantity of this reaction product used is 0.008 mole (dialkyl Mg basis).

The reaction liquid medium consists essentially of the ether which accompanies the catalyst material. The quantity used is 11.2 parts.

The polymerization reaction procedure is substantially the same as that described in Examples 1–3. The reaction period is 216 hours with 0.004 mole of the catalyst material being introduced into the polymerization reactor at the beginning of the reaction period, and with the remainder of the catalyst material being introduced into the polymerization reactor after 19 hours of the reaction period. The reaction temperature is 30° C. for the first 90 hours and then 50° C. for the remaining 126 hours of the reaction period.

At the end of the reaction period the reaction mixture is admixed with 10 volumes of toluene and then admixed with 5–10 volumes of heptane. The resulting solids are collected, dissolved in toluene and again precipitated with heptane. This procedure is repeated once more, and the solid product thus obtained washed twice with a 30:70 weight mixture of toluene and heptane, and then placed in a vacuum of 0.4 millimeter of mercury for 16 hours at 80° C.

The resulting polymer product typically is a white powder with no X-ray crystallinity. It typically is soluble in acetone and in dimethylformamide.

This product has utility as an additive to lubricating oils to improve flow properties.

EXAMPLES 30–45

These examples illustrate cyclic phosphorus containing polymer products of this invention made from cyclic alkylene haloalkyl phosphate monomer material, and processes for making them.

The monomer material used in these examples consists essentially of 2-(β-chloroethoxy)-2-oxo-1,3,2-dioxaphosphorolane.

The catalyst material and composition of the reaction liquid medium employed in each example are set forth in the following Table VI. The organoaluminum catalysts are made as in Examples 12–15. The dialkylmagnesium polyreactive compound reaction product catalysts are made as described in Examples 1–3. The ferric chloride-propylene oxide catalyst in Example 45 is made as taught in the U.S. Pat. 2,706,181, to Pruitt et al.

The procedure for effecting polymerization of the monomer material in each example is substantially the same as that followed in Examples 1–3. Specific reaction conditions are set forth in Table VI.

In Examples 30–39 and 45, polymer product is precipitated from the reaction mixture by admixing with the reaction mixture 10 volumes of ether, whereby a precipitate forms, permitting the precipitate to settle, decanting the supernatant therefrom, washing the solid material two times with fresh ether and then once with ether containing 4,4′-thiobis(6-t-butyl-m-cresol) at a 0.2% concentration, and then placing the washed solids in a 0.4 millimeter of mercury vacuum for 16 hours at 80° C. Typical properties of the polymer product thus obtained in each example are set forth in Table VI.

In Examples 40–44, polymer product is separated from the reaction mixture by precipitation with 10 volumes of ether followed by washing of the precipitate twice with fresh ether and then once with ether containing 4,4′-thiobis(6-t-butyl-m-cresol), and then by dissolution of the washed solids in methylene chloride. The solution is then centrifuged to remove solid catalyst material. Methylene chloride is then stripped from the centrifuged solution and the solid residue is placed in a 0.4 millimeter of mercury vacuum for 16 hours at 80° C. Typical properties of the polymer product thus obtained in each example are set forth in Table VI.

organozinc reaction product is made in the same way as the dialkyl magnesium polyreactive compound catalyst

TABLE VI

| | | | | | Polymerization reaction conditions | | | | | | |
|---|---|---|---|---|---|---|---|---|---|---|---|
| | | | | | | Liquid reaction medium | | | Polymer product | | |
| Ex. No. | Qty. of Mon'r (parts) | Catalyst | Mole qty. of cat. | Reac. time (hrs.) | Reac. temp. (° C.) | With cat. | Parts | Added separately | Parts | Appearance | X-ray xtalinity | RSV |
| 30 | 5 | Triisobutyl Al-0.5$H_2O$. | 0.002 | 19 | 0 | Ether and heptane (50:50 vol). | 2.8 | Ether | 15 | Tacky solid | None | 0.06 |
| 31 | 5 | Triisobutyl Al-1.3$H_2O$. | 0.002 | 19 | 5 | do | 2.8 | do | 15 | Clear and rubbery. | do | 0.06 |
| 32 | 5 | Triisobutyl Al-0.5$H_2O$. | 0.002 | 19 | 0 | do | 2.8 | Methylene chloride. | 28 | White solid | High | 0.04 |
| 33 | 5 | Triisobutyl Al-1.3$H_2O$. | 0.002 | 19 | 5 | do | 2.8 | None | | Clear and rubbery. | None | 0.17 |
| 34 | 2.5 | Diethyl Mg-0.8$NH_3$. | 0.0005 | 19 | 5 | Ether | 0.7 | Ether | 6.1 | Soft and tacky. | do | 0.10 |
| 35 | 2.5 | Diethyl Mg-0.3 resorcinol. | 0.001 | 19 | 5 | do | 1.4 | do | 7.5 | Tacky solid | | |
| 36 | 2.5 | Diethyl Mg-1.0 $H_2O$. | 0.001 | 19 | 5 | do | 1.4 | do | 7.5 | Rubbery solid. | Trace | 0.11 |
| 37 | 2.5 | Isopropyl MgCl | 0.001 | 19 | 5 | do | 1.4 | do | 7.5 | Tacky solid | | |
| 38 | 2.5 | Diethyl Mg-0.4$NH_3$. | 0.001 | 19 | −78 | do | 1.4 | Methylene chloride. | 8.5 | do | Trace | 0.10 |
| 39 | 2.5 | Triisobutyl Al-1.3$H_2O$. | 0.001 | 19 | 5 | do | 1.4 | do | 28 | Clear and hard solid. | None | 0.11 |
| 40 | 10 | BaO | 0.0006 | 96 | 5 | None | | Ether | 8.9 | Tacky solid | do | |
| 41 | 10 | $CaNH_2$ | 0.001 | 19 | 5 | Ether | 1.4 | do | 8.2 | Tough and rubbery solid. | do | 0.06 |
| 42 | 10 | Mg-acetylacetonate. | 0.0005 | 96 | 5 | None | | do | 8.9 | Tough and brittle solid. | do | |
| 43 | 10 | $MgSO_4$ | 0.0008 | 96 | 5 | do | | do | 8.9 | Tacky solid | do | |
| 44 | 10 | $MgCO_3 \cdot Mg(OH)_2 \cdot 3H_2O$. | 0.0005 | 96 | 5 | do | | do | 8.9 | Brittle solid | do | 0.06 |
| 45 | 2.5 | $FeCl_3$-$(C_3H_6O)_{2.5}$ | 0.0001 | 72 | 80 | do | | None | | Dark brown to black rubbery solid. | | |

The polymer products of these examples are useful as flame-resistant stabilizers or synthetic resins and the like.

EXAMPLES 46–62

These examples illustrate cyclic phosphorus containing polymer products of this invention made from other alkylene alkoxy phosphate monomer material, and processes for making them.

The cyclic phosphorous monomer material employed in these examples consists essentially of 2-ethoxy-2-oxo-1,3,2-dioxaphospholane.

The catalyst material and composition of reaction liquid medium used in each of the examples are identified in the following Table VII. The dialkyl magnesium-polyreactive compound catalysts are made as described in Examples 1–3. The organoaluminum reaction product catalysts are made as described in Examples 12–15. The and is used while in a 0.5 molar solution, the solvent being ether.

The polymerization reaction procedure involved in each example is generally that described in Examples 1–3. Specific reaction conditions are given in Table VII. In Example 51 half of the catalyst is added at the beginning of the reaction and after 19 hours of reaction time the remaining half is added.

In Examples 46–59, a polymer product is separated from the polymerization reaction mixture by generally the same procedure described in conjunciton with Examples 31–40 and 45. Typical physical properties of these products are summarized in Table VII.

In Examples 60–62, polymer product is separated from the polymerizaiton reaction mixture by generally the same procedure described in connection with Examples 41–44. Physical properties typical for these products are likewise summarized in Table VII.

TABLE VII

| | | | | | Polymerization reaction conditions | | | | | | |
|---|---|---|---|---|---|---|---|---|---|---|---|
| | | | | | | Liquid reaction medium | | | Polymer product | | |
| Ex. No. | Qty. of mon'r (parts) | Catalyst | Mole qty. of cat. | Reac. time (hrs.) | Reac. temp. (° C.) | With cat. | Parts | Added separately | Parts | Appearance | X-ray xtalinity | RSV |
| 46 | 5 | Triisobutyl Al-1.0$H_2O$ | 0.002 | 19 | 5 | Ether-heptane (50:50 vol). | 2.8 | Methylene chloride. | 28 | Tacky solid | None | 0.45 |
| 47 | 5 | Triisobutyl Al-1.3$H_2O$ | 0.002 | 19 | 5 | do | 2.8 | do | 28 | Clear and rubbery solid. | Trace | 0.41 |
| 48 | 2.5 | do | 0.002 | 19 | 0 | Ether | 2.8 | do | 11.3 | Rubbery solid | None | 0.06 |
| 49 | 2.5 | Triisobutyl Al-1.0 acetylacetonate. | 0.001 | 19 | 5 | Heptane | 1.4 | Ether | 7.5 | Soft and tacky solid. | do | 0.07 |
| 50 | 2.5 | Diethyl Zn-0.9$H_2O$ | 0.001 | 19 | 5 | Ether | 1.4 | do | 7.5 | Tacky solid | do | 0.24 |
| 51 | 2.5 | (HT)Diethyl Mg-0.8$NH_3$ | 0.024 | 26 | 5 | do | 33.6 | do | 6.1 | Rubbery solid | do | 0.13 |
| 52 | 2.5 | Diethyl Mg-0.8$NH_3$ | 0.001 | 19 | 5 | do | 1.4 | do | 6.1 | Tacky rubber | do | 0.11 |
| 53 | 2.5 | Diethyl Mg-1.0$H_2O$ | 0.001 | 19 | 5 | do | 1.4 | do | 7.5 | Tacky solid | do | 0.17 |
| 54 | 2.5 | Diethyl Mg-1.0$CH_3CN$ | 0.001 | 19 | 5 | do | 1.4 | do | 6.1 | Gel and rubbery solid. | do | 0.15 |
| 55 | 2.5 | Diethyl Mg-0.5 CO | 0.001 | 19 | 5 | do | 1.4 | do | 6.1 | Tacky and rubbery solid. | do | 0.16 |
| 56 | 2.5 | Diethyl Mg-0.5 acetylacetonate. | 0.001 | 19 | 5 | do | 1.4 | do | 6.1 | Tacky mass | do | 0.18 |
| 57 | 2.5 | Diethyl Mg-0.5$CS_2$ | 0.001 | 19 | 5 | do | 1.4 | do | 6.1 | Rubbery solid | do | 0.18 |
| 58 | 2.5 | Diethyl Mg-0.5 Acetic acid | 0.001 | 19 | 5 | do | 1.4 | do | 6.1 | do | do | 0.09 |
| 59 | 2.5 | Diethyl Mg-0.5 nitrobenzene. | 0.001 | 19 | 5 | do | 1.4 | do | 6.1 | Rubbery and tough solid. | do | 0.16 |
| 60 | 10 | $MgCO_3 \cdot Mg(OH_2) \cdot 3H_2O$ | 0.0005 | 96 | 5 | None | | do | 8.9 | Tacky solid | do | |
| 61 | 10 | $CaNH_2$ | 0.001 | 19 | 5 | Ether | 1.4 | do | 8.1 | Rubbery solid | do | |
| 62 | 10 | BaO | 0.0006 | 96 | 5 | None | | do | 8.9 | Tacky solid | do | |

These polymer products are useful as flame-resistant heat stabilizers for synthetic resins and the like.

EXAMPLES 63–65

These examples illustrate copolymer products of this invention made from organophosphorous monomer material and oxirane monomer material.

The monomer material employed in Example 63 consists essentially of 5 parts of epichlorohydrin and 5 parts of 2-phenoxy-2-oxo-1,3,2-dioxaphospholane.

The monomer material employed in Example 64 consists essentially of 5 parts of epichlorohydrin and 5 parts of 2-phenoxy-2-oxo-1,3,2-dioxaphospholane.

The monomer material employed in Example 65 is 5 parts of ethylene oxide and 5 parts of 3-phenoxy-2-oxo-1,3,2-dioxaphospholane.

The polymerization catalyst material employed in each of these examples consists essentially of triethyl

acetylacetonate reaction product made as taught in U.S. Pat. 3,135,705 and at a 0.5 mole concentration in a 70:30 (weight ratio) of ether-heptane. In each case the quantity of catalyst used is 0.004 mole (trialkyl Al basis).

The liquid reaction medium in each example consists essentially of 5.6 parts of the liquid accompanying the catalyst material and 79 parts of toluene which is separately added.

The procedure for carrying out the polymerization reaction in each example is the same as in Examples 1–3.

Separation of polymer product from the reaction mixture obtained in each example is accomplished by the admixture of a quantity (1–4 volumes) of ether to the mixture sufficient to completely precipitate the product, collecting the insoluble product, washing it twice with fresh ether, and once with ether containing 4,4'-thiobis(6-t-butyl-m-cresol) at a 0.2% concentration, and subjecting the washed product to a 0.4 millimeter of mercury vacuum for 6 hours at 20–25° C. in Example 63 and at 80° C. in Examples 64 and 65.

In Example 63 the polymer product thus obtained typically is a white film having a crystalline X-ray pattern and an RSV=3.0, measured at a 0.1 concentration in α-chloronaphthalene containing 3% acetylacetone at 100° C. A typical analysis of the product shows a phosphorus monomer content of 8.6%.

In Example 64 the polymer product so obtained typically is a white tough solid having an X-ray pattern showing moderate crystallinity, and an RSV=1.8, measured in α-chloronaphthalene containing 3% acetylacetone at 100° C. A typical analysis of this product indicates a phosphorus monomer content of 7.9%.

In Example 65 the polymer product typically is a tough solid having moderate X-ray crystallinity and an RSV=20.2 when measured in chloroform at 25° C. A typical analysis of this product shows a phosphorus monomer content of 4.3%.

The polymer products of Examples 63 and 64 have utility as property improves when blended with crystalline and rubbery materials. The polymer product of Example 65 has utility as a water soluble polymer type thickener, protective colloid, and the like.

EXAMPLES 66–69

These examples illustrate copolymer products of this invention made from cyclic organo phosphorus monomer material and trioxane.

The monomer material employed in Example 66 consists essentially of 95 parts of trioxane and 5 parts of 2-(β-chlorothoxy)-2-thiono-1,3,2-dioxaphospholane.

The monomer material in Example 67 consists essentially of 95 parts of trioxane and 5 parts of 2-methoxy-2-thiono-1,3,2-dioxaphospholane.

The monomer material of Example 68 consists essentially of 95 parts of trioxane and 5 parts of 2-ethoxy-2-oxo-1,3,2-dioxaphospholane.

The monomer material in Example 69 consists essentially of 95 parts of trioxane and 5 parts of 2-ethoxy-2-oxo-1,3,2-dioxaphosphaindane.

The polymerization catalyst material in each of these examples consists essentially of boron trifluoride ($BF_3$) etherate. The quantity of catalyst material used in Examples 66, 68 and 69 is 0.4 millimole based on the total monomer material. The quantity of catalyst material used in Example 67 is 1.2 millimole based on the total monomer material.

Except for the liquid (benzene) which accompanies the catalyst material (0.8 molar solution of catalyst material in benzene), the quantity of which can be disregarded (in Examples 66, 68 and 69, the quantity of liquid reaction medium is 0.5 part while in Example 67 the total quantity of liquid reaction medium is 1.5 parts), no liquid in addition to the reactants is present.

The procedure for carrying out the polymerization reaction in each example is the same as in examples of 1–3 with the reaction time being 1 hour in Examples 66, 68 and 70, and 28 hours in Example 67, and the reaction temperature being 65° C. However, in Example 67 the quantity of catalyst solution initially admixed with the monomer material is such that the quantity of catalyst is 0.4 millimole based on the total monomer material, and additional equal quantities of catalyst solution are added after 2 hours of reaction time and 20 hours of reaction time.

Separation of polymer product from the reaction mixture obtained in each example is accomplished by adding approximately 5 volumes of acetone to the reaction mixture, agitating the reaction mixture in acetone at 50° C. for 16 hours, collecting the insoluble product, washing it twice with hot acetone and once with acetone containing 4,4'-thiobis(6-t-butyl-m-cresol) at a 0.2% concentration. Thereafter, the washed product is subjected to a 0.4 millimeter of mercury vacuum for 16 hours at 80°C.

In Example 66 the polymer product thus obtained is a solid having typically a high poly(formaldehyde) crystallinity pattern by X-ray, and an RSV=0.12 measured at 0.1% and 150° C. in dimethylformamide containing diphenylamine at a concentration of 1 gram per 100 milliliters of the solvent. The product typically has a 20% phosphorus monomer content based on phosphorus analysis.

The polymer product in Example 67 is a solid having typically an RSV=0.07 when measured in dimethylformamide containing for each 100 milliliters thereof 1 gram of diphenylamine.

In Example 68, the polymer product is a solid having typically on X-ray analysis poly(formaldehyde) crystallinity and an RSV=0.17 when measured at 0.1% at 150° C. in dimethylformamide containing 1 gram of diphenylamine per 100 milliliters of solvent. Differential thermal analysis of the product typically gives a melt range of 110–157° C., a melting point of 157° C. and $\Delta H_f$=35 calories per gram. A typical phosphorus comonomer content is 4.0% on the basis of phosphorus analysis.

In Example 69 the polymer product is a solid having typically on X-ray analysis poly(formaldehyde) crystallinity, and an RSV=0.42 when measured at 0.1% at 150° C. in dimethylformamide containing diphenylamine at a concentration of 1 gram per 100 milliliters of solvent. On differential thermal analysis it has a typical melt range of 110–160° C., a melting point of 159° C. and $\Delta H_f$=42 calories per gram. A typical phosphorus comonomer content is 1.1% based on phosphorus analysis.

The polymer products of these examples have utility as flame resistant materials of construction for shaped articles including unoriented and oriented films and fibers.

EXAMPLE 70

This example illustrates a specific embodiment of the phosphorus polymer of this invention, and its preparation, wherein Q in Formula I is an $\overset{-\,+}{OM}$ radical.

90 parts of 2-methoxy-2-thiono-1,3,2-dioxaphospholane is polymerized according to the procedure of Examples 4–6. The catalyst material consists essentially of diethylmagnesium dissolved in sufficient ether to form a 0.5 molar solution. The quantity of catalyst material employed in the polymerization reaction is 0.0004 mole. The reaction period is 19 hours and the reaction temperature is 0–3° C. No liquid reaction medium in addition to that accompanying the catalyst material is added to the polymerization reactor.

Work-up of the polymer product is substantially the same as in Example 1 with methanol being the precipitating liquid.

The polymer product is purified by dissolving in methylene dichloride, precipitating with benzene denatured ethanol, washed twice with benzene denatured ethanol and once with benzene denatured alcohol containing 4,4'-thiobis(6 - t - butyl-m-cresol at a 0.2% concentration. The thus purified product is placed in a vacuum of 0.4 millimeter of mercury for 6 hours at 80° C. Typical properties of the purified product include RSV=0.10, low X-ray crystallinity and on differential thermal analysis a melt range of 46–75° C., a melting point of 75° C., and a $\Delta H_f$=3.0 calories per gram.

A quantity (9.4 parts) of the purified polymer product is placed into a reaction vessel fitted with a water condenser and a magnetic stirrer, and containing 0.060 mole of sodium bicarbonate dissolved in 422 parts of water. Dioxane equal in volume to the mixture in the reaction vessel is added, and the contents of the reaction vessel are then refluxed for 4 hours. The reaction mixture is cooled and then filtered to separate the precipitate that appears. The filtrate is then dialyzed. The small amount of precipitate that forms is removed by centrifugation, and the liquid in the supernatant is removed by evaporation.

The resulting solids constitute the desired polymer product. It is soluble in water. A typical RSV of the product when measured in water at a 0.1% concentration and at 25° C. is 0.13. Typically it has no X-ray crystallinity and on analysis has a typical phosphorous content of 19.8% (calculated=19.1%) and a sodium content of 2.6% (calculated=14.2%). The low sodium content of the hydrolyzed polymer indicates that in the dialysis step a significant portion of the sodium is removed and replaced by the hydrogen ion.

This water-soluble polymer product has utility as a thickener, protective colloid and the like.

EXAMPLE 71

This example illustrates another specific embodiment, and its preparation, of the polymer of this invention wherein Q in Formula I is $\overset{-\,+}{OM}$.

A quantity (5.75 parts) of the polymer product of Example 50 is added to a reaction vessel provided with a magnetic stirrer and containing 3.18 parts of sodium bicarbonate dissolved in 315 parts of water. The resulting mixture is stirred for 2 hours at 20–25° C. The reaction mass is then dialyzed and the small quantity of precipitate that forms is removed by centrifugation. The liquid portion of the supernatant is then removed by evaporation.

The solids that remain constitute the desired polymer product. It is water soluble. A typical RSV of the product as measured in methyl chloride at a 0.1% by weight concentration at 25° C. is 0.08. A typical phosphorous content is 19.2% (calculated=20.3%).

This product has utility as a thickener for aqueous media, a protective colloid, and the like.

Other features, advantages and specific embodiments of this invention will be readily apparent to those in the exercise of ordinary skill in the art after reading the foregoing disclosures. Such specific embodiments are within the scope of the claimed subject matter unless expressly excluded by claim language. Also, while specific embodiments of this invention have been described in considerable detail, variations and modifications of these embodiments can be effected without departing from the spirit and scope of the claimed subject matter.

What I claim and desire to protect by Letters Patent is:

1. Normally solid phosphorus polymer, said polymer being a homopolymer or a copolymer characterized by the recurring structural unit having the formula:

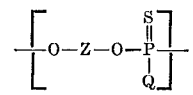

wherein Q is selected from the group consisting of the OR and $\overset{-\,+}{OM}$ radicals, R is selected from the group consisting of alkyl, cycloalkyl and aryl radicals and these radicals containing as substituents alkyl, cycloalkyl, aryl, halo, haloalkyl, cyano and cyanoalkyl radicals, $\overset{+}{M}$ is selected from the group consisting of the H and alkali metal cations, and Z is a radical selected from the group consisting of alkylene, cycloalkylene and arylene radicals, said homopolymers and copolymers having a reduced specific viscosity of at least about 0.09 as measured on a 0.1% solution in dimethylformamide, the comonomer of said copolymers being derived from at least one of the group selected from epoxides, aldehydes and oxetanes.

2. Normally solid phosphorus polymer according to claim 1, wherein Z is the ethylene radical.

3. Normally solid phosphorus polymer according to claim 2, wherein R is the phenyl radical.

4. Normally solid phosphorus polymer according to claim 2, wherein R is the methyl radical.

5. Normally solid phosphorus polymer according to claim 2, wherein R is the β-chloroethyl radical.

6. Normally solid phosphorus polymer according to claim 2, characterized by substantial X-ray crystallinity.

7. Normally solid phosphorus polymer according to claim 1, wherein Z is the 1,2-cyclohexylene radical and R is the ethyl radical.

8. Normally solid phosphorus polymer according to claim 1, wherein Z is the 1,2-phenylene radical and R is the ethyl radical.

9. Normally solid phosphorus polymer according to claim 1, wherein Z is the ethylene radical, and Q is the $\overset{-\,+}{OM}$ radical.

10. Phosphorus polymer material according to claim 1, which comprises a copolymer wherein the comonomer is trioxane.

11. A process for making a normally solid phosphorus polymer, which comprises polymerizing a cyclic phosphorus monomer having the general formula:

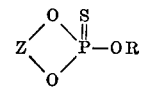

wherein R is a radical selected from the group consisting of alkyl, cycloalkyl and aryl radicals and these radicals containing as substituents alkyl, cycloalkyl, aryl, halide, haloalkyl, cyano and cyanoalkyl radicals, and Z is a radical selected from the group consisting of alkylene, cycloalkylene and arylene radicals by contacting said monomer with a polymerization catalyst material therefor at a catalytic concentration, said catalyst material consisting essentially of a dialkylmagnesium, an alkylmagnesium halide or the reaction product of a dialkylmagnesium and a polyreactive compound at an equivalent mole ratio in a range of from about 0.01 to about 0.7, said polyreactive compound being selected from (1) compounds containing at least two groups selected from active hydrogen, C=O, N=O, S=O, P=O, C=S, P=S, C≡N, and N=S, (2) carbon monoxide, and (3) nitrogen monoxide.

12. A process according to claim 11 wherein said polymerization catalyst material consists essentially of the reaction product of a dialkylmagnesium and ammonia at an equivalent mole ratio in a range from about 0.01 to about 0.7.

13. A process according to claim 11, wherein said polymerization catalyst material consists essentially of a dialkylmagnesium.

References Cited

UNITED STATES PATENTS

| | | | |
|---|---|---|---|
| 2,636,876 | 4/1953 | Zenftman et al. | 260—2 |
| 2,871,202 | 1/1959 | Scott | 260—2 |
| 3,298,967 | 1/1967 | Mason | 260—2 |
| 2,616,873 | 11/1952 | Cass | 260—61 |
| 2,964,477 | 12/1960 | Pilat et al. | 260—61 |
| 3,169,925 | 2/1965 | Mahoney | 260—61 |

SAMUEL H. BLECH, Primary Examiner

U.S. Cl. X.R.

260—2, 429.9, 448, 52, 899, 33.6, 32.8, 32.6, 33.8, 45.9, 79, 67, 29.2, 890, 897, 823, 37, 41, 45.7, 937, 606.5; 252—49.8, 428, 431; 44—62, 76

PO-1050
(5/69)

UNITED STATES PATENT OFFICE
CERTIFICATE OF CORRECTION

Patent No. __3,520,849__      Dated __July 21, 1970__

Inventor(s) __Edwin J. Vandenberg__

It is certified that error appears in the above-identified patent and that said Letters Patent are hereby corrected as shown below:

Col. 12, in the last column of Table II opposite Example 5, " 0.20 " should read -- 0.10 --.

Col. 20, line 43, " conjunciton " should read -- conjunction --.

Col. 21, line 14, " 3-phenoxy- " should read -- 2-phenoxy- --.

Col. 21, line 72, " 2-($\beta$-chlorothoxy)- " should read -- 2-($\beta$-chloroethoxy)- --.

SIGNED AND SEALED
DEC 1 - 1970

(SEAL)
Attest:

Edward M. Fletcher, Jr.
Attesting Officer

WILLIAM E. SCHUYLER, JR.
Commissioner of Patents